United States Patent
Danowitz et al.

(10) Patent No.: US 9,036,047 B2
(45) Date of Patent: May 19, 2015

(54) APPARATUS AND TECHNIQUES FOR IMAGE PROCESSING

(71) Applicant: Intel Corporation, Santa Clara, CA (US)

(72) Inventors: Jeffrey Danowitz, Tel Aviv (IL); Sarit Shwartz, Haifa (IL); Ziv Aviv, Bat Hefer (IL); David Stanhill, Hoshaya (IL)

(73) Assignee: INTEL CORPORATION, Santa Clara, CA (US)

( * ) Notice: Subject to any disclaimer, the term of this patent is extended or adjusted under 35 U.S.C. 154(b) by 147 days.

(21) Appl. No.: 13/797,898

(22) Filed: Mar. 12, 2013

(65) Prior Publication Data
US 2014/0267826 A1    Sep. 18, 2014

(51) Int. Cl.
H04N 9/73 (2006.01)
H04N 5/235 (2006.01)

(52) U.S. Cl.
CPC ................................ *H04N 5/235* (2013.01)

(58) Field of Classification Search
CPC .. H04N 9/73; H04N 9/735; G09G 2320/0666
USPC ......... 348/223.1, 224.1, 225.1; 382/162, 164, 382/167, 168, 169
See application file for complete search history.

(56) References Cited

U.S. PATENT DOCUMENTS

| | | | |
|---|---|---|---|
| 7,599,550 B1 * | 10/2009 | Kaplinsky | ...................... 382/162 |
| 2011/0096190 A1 * | 4/2011 | Silverstein et al. | ........ 348/223.1 |
| 2014/0078340 A1 * | 3/2014 | Lin | ............................ 348/223.1 |

* cited by examiner

*Primary Examiner* — Lin Ye
*Assistant Examiner* — Chriss Yoder, III
(74) *Attorney, Agent, or Firm* — Kacvinsky Daisak Bluni, PLLC

(57) ABSTRACT

An apparatus may include an image sensor that contains a multiplicity of pixel elements to detect one or more images and a processor circuit coupled to the image sensor. The apparatus may include a white balance module for execution on the processor circuit to receive, based upon a detected image of the one or more images, for a plurality of pixel elements of the multiplicity of pixel elements, three of more gray level values for a respective three or more color channels, to determine grayness likelihood functions for the respective three or more color channels, the three or more grayness likelihood functions comprising a proportional contribution to grey pixels of the detected image from one or more gray levels for each respective color channel, and to determine a white balance gain for two or more color channels based upon the determined grayness likelihood functions. Other embodiments are described and claimed.

27 Claims, 9 Drawing Sheets

APPARATUS AND TECHNIQUES FOR IMAGE PROCESSING

TECHNICAL FIELD

Embodiments described herein generally related to electronic imaging and in particular to white balancing for image processing.

BACKGROUND

In the present day sensors that are used to capture digital images typically contain an array of pixels that each records light intensity or luminance. Such sensors may employ charge coupled devices (CCD) or other semiconductor devices as the detector part of a sensor element or cell. In order to record color images in a digital format a twodimensional color filter is typically applied to filter light before the light impinges on sensor pixels. The color filter includes an array of sub-filters that are each designed to transmit light of only a given wavelength (range) to a given cell or sub-pixel. As an example, in some filters, the array of sub-filters may be composed of red, green, and blue sub-filters. Thus, any given detector of the sensor covered by such a filter may receive red, green, or blue light, rendering each detector of the sensor as a respective red, green, or blue sub-pixel. Each sub-pixel thereby records photons of the respective red, green or blue light wavelength range and transforms the photons into a charge that is proportional to the amount of light.

In some cameras cyan, magenta, and yellow (CMY) sub-filters are used rather than red, green, blue (RGB) filters because the former transmit more light. Other filters may employ four different color sub-filters. Regardless of the color filter scheme, a common factor in all color filter array sensors or cameras is that each cell in the camera sensor captures light of one color and converts the received light into a gray level intensity or grayscale value for that color.

Typically, the captured gray-levels are transformed to a new set of gray levels that can be presented either on a screen or via some media format. This process is commonly known as a camera image/signal processing (ISP). The image usually is initially captured as a one-channel image such that the desired color of a three-channel image is subsampled (mosaicked) along the imaging sensor matrix upon capture.

In order to output a full-color image for a mosaicked image, an interpolation process called demosaicking is employed. However, before demosaicking, a "white balancing" process is commonly performed to the captured image. White balancing refers to a procedure that adjusts intensity values for different color channels in white (gray) regions of an image such that the adjusted values for different colors, such as red, green and blue, are as identical to one another other as possible. Thus if a gray patch is captured with uniform lighting, all of the sub-pixels or cells (whether red, green, or blue) should report nearly the same intensity level. In general, known methods that correct white-imbalance involve the computation of global (full image) gains for the red, the green and the blue cells. Provided that the pedestal (black level) has been removed from the image, these gains, if chosen properly, may correct the white-imbalance in the image.

However, image processing based upon the commonly employed approaches used in the present day equally treat all the pixels of the recorded image, even though in typical images many or most the pixels may not represent gray regions. Accordingly, white balancing based upon known procedures may be inaccurate.

Accordingly, there may be a need for improved techniques and apparatus to solve these and other problems.

DETAILED DESCRIPTION

Figure 1:
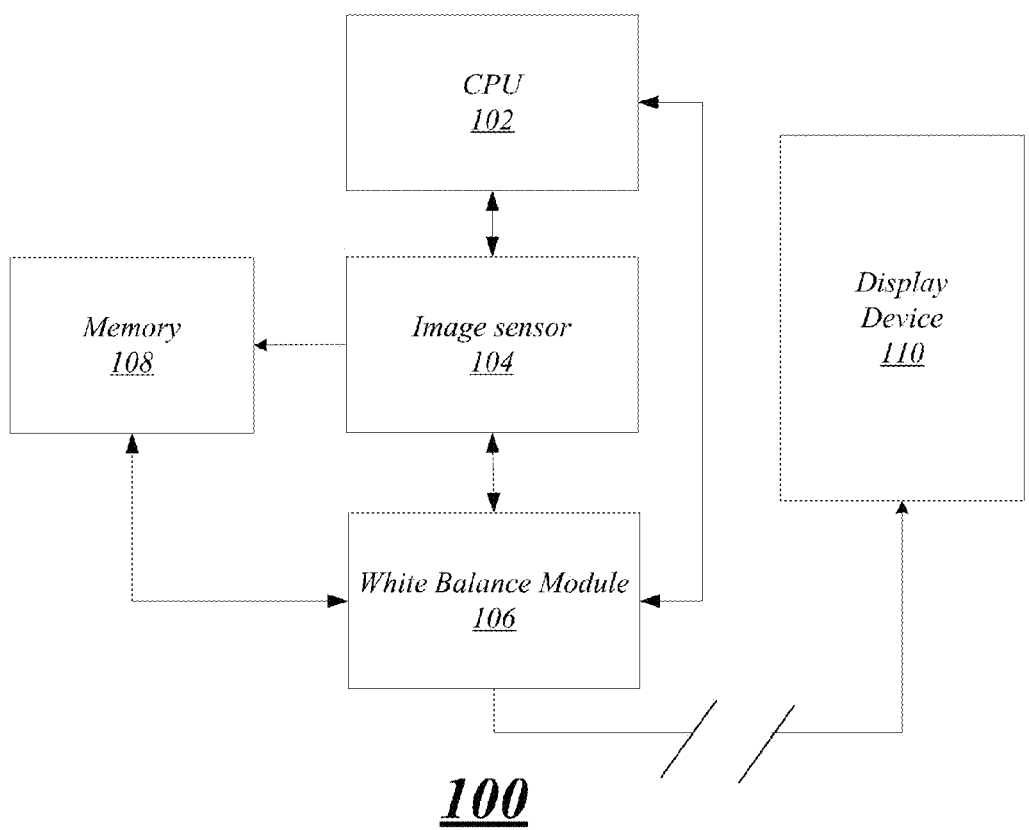
FIG. 1 depicts an embodiment of a system.

Embodiments are related to processing of digitally recorded color images. In various embodiments, techniques are provided to efficiently and accurately determine white balance gains to be applied to color pixel cells of a color sensor system, such as an RGB sensor. Various embodiments overcome inaccuracies based upon current white balancing approaches.

Various embodiments harness the strengths of currently employed gray world and gray-patch approaches and combine aspects of those approaches in a novel and powerful manner that takes advantages of the best of both approaches.

Several methodologies are currently in practice for determining white balance gains for mosaicked images. One common approach is known as the gray world assumption. This methodology "assumes" that most of the world is gray and to this end, sums up the red, green, and blue pixel values over the entire recorded image, and equates the different colors. In one example, if SR=Sum(Red), SG=Sum(Green) and SB=Sum(Blue), and the green gain, GG, is defined as 1.0, then the Red Gain, RG=SG/SR and the Blue Gain, BG=SG/SB.

Another approach, known as the gray edge Assumption, assumes that most image edges are "gray" and therefore equates the gradients of the red, green and blue pixels in a similar manner as in the gray world Assumption. A further set of approaches, termed gray (white) patch, involves algorithms that attempt to locate gray patches in an image using various strategies. Once these patches are found, the white balance gains can be automatically calculated.

However, since all the pixel values are equally weighted in the gray world approach, calculation of the appropriate gains to be applied to different pixels may be inaccurate.

The present embodiments instead provide approaches that determine a proportional contribution to gray-like pixels of an image from each color channel as detailed below. Depicted by the respective R, G, B grayness likelihood functions 506A, 506B, and 506C, the final values once an entire image is processed indicate the proportional contribution to grey-like pixels of the image from a respective R, G, B color channel.

Moreover, in various embodiments white balancing is based upon data collected over an entire image so that calculation of appropriate gains is more global than the known approaches that employ analysis of local white patches. This has the advantage of avoiding the necessity of automatic determination of white patches which involves non-trivial calculations.

Various embodiments may comprise one or more elements. An element may comprise any structure arranged to perform certain operations. Some elements may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 depicts an embodiment of a system 100 consistent with the present embodiments. The system 100 includes a processor circuit (termed "CPU" herein) 102, an image sensor 104, a white balance module 106, memory 108, and display device 110. The CPU 102 and image sensor 104 may form part of a platform that includes other components, such as display engine, memory, memory controllers, and other components as will be apparent to those of skill in the art. In some embodiments, the system 100 may be embodied in a digital camera, video camera, smartphone, cellular telephone, laptop computer, tablet computing device, desktop computer, electronic game device, a home appliance, or other electronic device. The embodiments are not limited in this context.

In particular, in various embodiments the CPU 102 and/or white balance module 106 in particular may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Examples of a display device 110 include a liquid crystal display (LCD), light emitting diode display (LED), touch sensitive display, plasma display, cathode ray tube, and other display types. In various embodiments, the system 100 may include various input devices (not shown) including, but not limited to, keyboards, keypads, mouse, joystick, touchscreen, or other input devices.

In operation, and as detailed below, the white balance module 106 may execute on a processor in the system 100 such as the CPU 102, to generate white balance gains for images recorded by the image sensor 104. Unless otherwise noted, the terms "image sensor" and "sensor" are used herein generally to refer to the same entity, namely a device that detects and/or records electromagnetic radiation that can be used to generate an image. More particularly, the sensors of the present embodiments are color sensors that are arranged in an array of pixels which employ three of more different color cells or sub-pixels. After generation of white balance gains, a white balanced image may be processed through an ISP chain according to known techniques for storage or presentation on a digital display, for example.

Figures 2A, 2B:
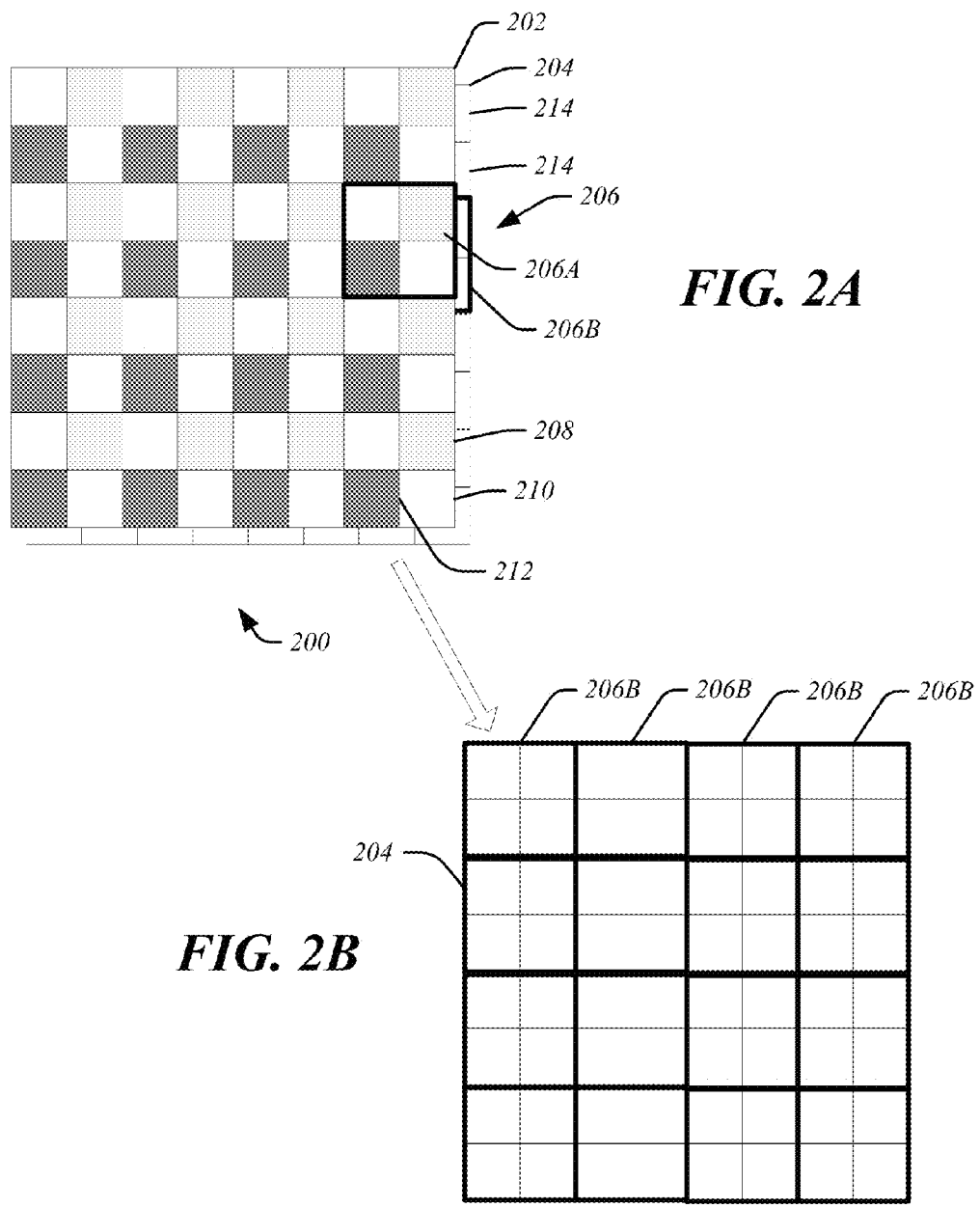
FIG. 2A depicts an exemplary sensor.
FIG. 2B depicts an exemplary detector level of the sensor of FIG. 2A.

FIG. 2A depicts details of a sensor 200 according to various embodiments. The sensor 200 includes a color filter 202 and detector 204. The color filter 202 is arranged to cover the detector 204 in a manner that intercepts light incident on the sensor 200 before the light strikes the detector 204. Visible wavelength light is filtered by the color filter 202 as described below.

As further illustrated in FIG. 2A, the color filter 202 of sensor 200 includes a two dimensional pattern or sub-filters 208, 210, 212, each or which represents a different color filter. Each sub-filter, together with an underlying detector element 214 may represent a sub-pixel or cell. In one implementation, the color filter 202 is a Bayer filter in which the sub-filters 208 are red filters, the sub-filters 210 are green filters, and the sub-filters 212 are blue filters. FIG. 2A also illustrates a pixel element 206 which represents a 2×2 array of sub-pixels within the sensor 200. In particular embodiments, the pixel element 206 includes a Bayer filter portion or component 206A that includes two green sub-filters, sub-filters 210, one red sub-filter 208, and one blue sub-filter 212. The pixel element 206 also includes a 2×2 array 206B of detector elements 214 that underlays the Bayer filter component 206A. Consistent with various embodiments, the sub-pixels in a pixel element may include an RGGB, BGGR, GRBG, or GBRG arrangement.

For clarity, FIG. 2B illustrates only the detector 204, which is arranged as a series of arrays 206B, each of which contains four detector elements 214. As shown in FIG. 2A, the Bayer filter component 206A repeats itself in a regular array throughout the filter 202. Thus, although the detector elements 214 may be substantially similar or identical to one another, neighboring detector elements 214 form a part of different subpixels according to the respective sub-filter (208, 210, 212) that overlies a given detector element 214.

Consistent with the present embodiments, gray level values are detected and recorded at the level of a pixel element, which includes three or more sub-pixels representing there or more different colors. As used herein, the terms "gray level," and "gray level values" are used interchangeably to refer to the discrete integral values associated with the detected light intensity of a sensor element. The terms may be used in conjunction with components such as sensors, sub-pixels, or pixels, as well as distributions, such as functions described herein below. In the embodiments generally depicted in the FIGs. the pixel element may be that of a Bayer filter sensor as described above, but other embodiments may employ other known color filters as will be appreciated by those of skill in the art. In the case of Bayer filters, each pixel element may output in a set of color-specific memory elements (channels), which includes a gray level (value) for a red sub-pixel, a gray level for a blue sub-pixel and a gray level for two green sub-pixels having the geometrical arrangement shown in FIG. 2A. The gray level output for the two different green sub-pixels may be averaged in some implementations.

Once an image is recorded, the red, green, and blue gray level intensities (denoted respectively as R, G, B herein) detected by an array of sensor pixel elements 206 may be processed by the white balance module 106 to determine the appropriate white balance gains to be applied to the raw image recorded by each pixel element 206. In particular, as detailed below, the white balance module 106 converts the gray level intensities R, G, B, into respective normalized intensities nR, nG, nB, for each pixel element. These normalized intensities are used to generate a set of "grayness likelihood" functions for the different color channels used to record the image at hand. When all the pixel elements of an image are processed the final grayness likelihood functions are used to set white balance gains for two or more color channels of the detected image.

Figure 3:
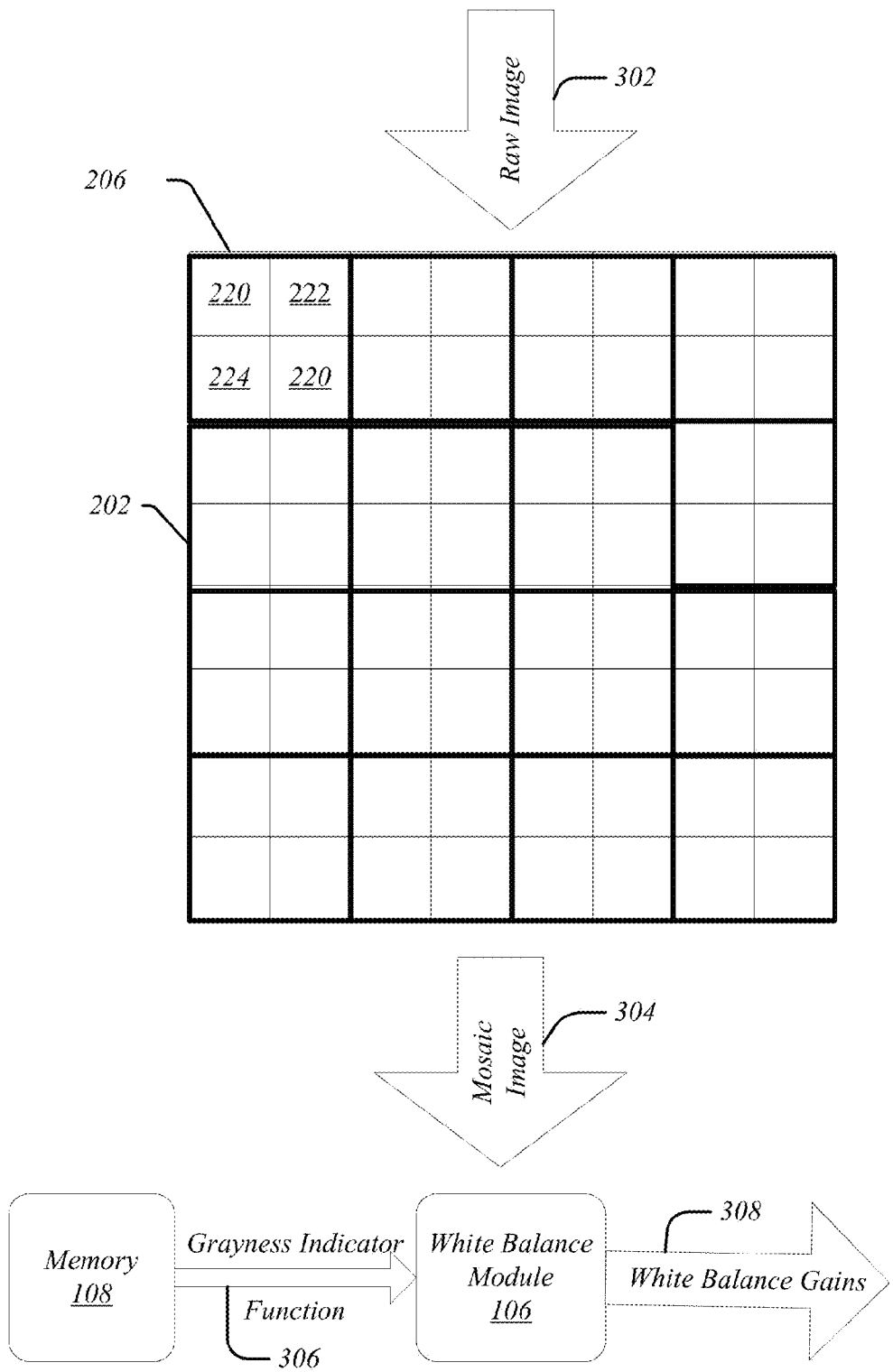
FIG. 3 depicts operation of an exemplary white balance module.

FIG. 3 depicts general features of operation of the white balance module 106 consistent with the present embodiments. A raw image 302 is detected by the sensor 200, which is arranged as discussed above. For clarity, in FIG. 3, a separate Bayer filter is not explicitly shown. Each pixel element 206 of sensor 200 records a set of grey level intensities or values R, G, B. In particular R is detected by sub-pixel 222, two sub-pixels 220 are used to detect G, and sub-pixel 224 detects B. These gray level intensities are recorded for the different pixel elements 206 of sensor 200, which generates a Bayer image that represents a mosaicked image of respective R, G, B, gray level intensities for each pixel element 206 used to record the raw image 302. The mosaicked image is received by the white balance module 106 as a mosaicked image 304, for further processing.

Figure 4:
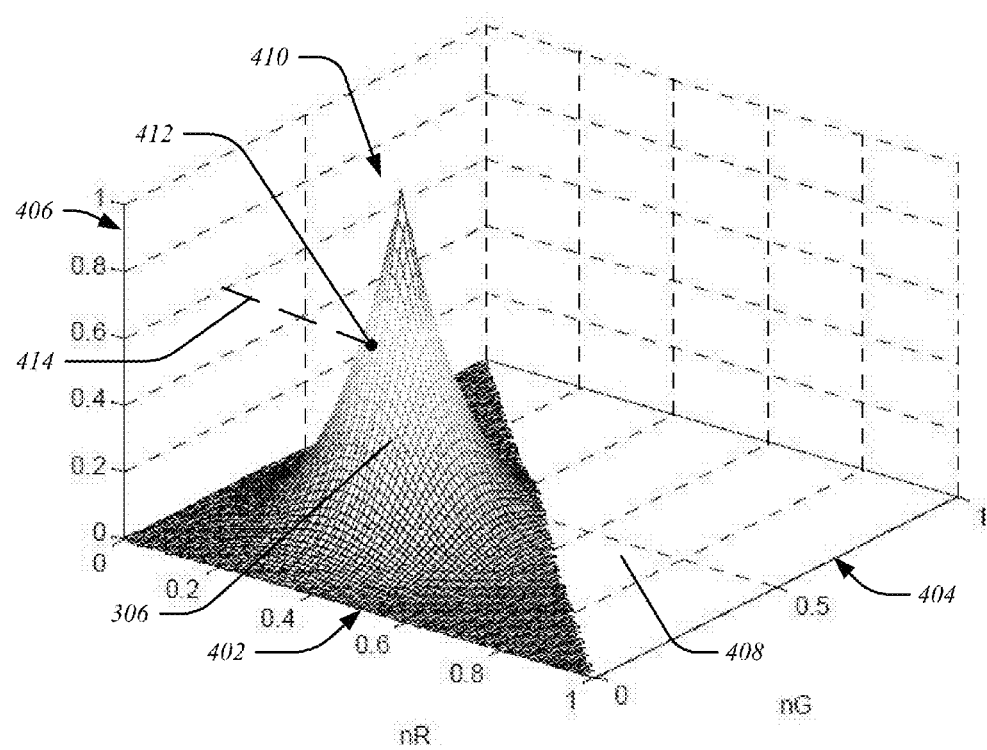
FIG. 4 depicts in graphical form an exemplary function.

As further illustrated in FIG. 3, the white balance module 106 receives a grayness indicator function 306, which may be stored in the memory 108. The grayness indicator function 306, discussed in detail below with respect to FIG. 4, is employed by the white balance module 106 in order to determine a degree of grayness corresponding to R, G, B values recorded for a given pixel element 206 being processed. As the data recorded by pixel elements 206 are processed the degree of grayness for each pixel element 206 is used to incrementally build a set of grayness likelihood functions for each color channel (in this case, R, G, B) of the sensor 200.

After processing the pixel elements 206 of sensor 200, the final grayness likelihood functions are employed by the white balance module 106 to generate the white balance gains 308. These white balance gains may then be used to adjust relative intensity of color channels corresponding to the pixel elements 206 used to record portions of the raw image 302, including portions of the raw image that are deemed to be white (gray). In this manner individual red, green, and blue values are equal to one another or more closely match one another in grey regions of an image. This procedure has the effect of using a weighted average approach to white balancing such that the contribution of each pixel element 206 is based upon the closeness of the pixel element 206 to being gray, where an ideal gray condition exists when the different color channels have equal gray level intensities.

In particular embodiments, in order to determine the likelihood of a pixel to be gray, the R, G, B values may be converted normalized-R, G, B values (nR, nG, nB), wherein $$nR = \frac{R}{R+G+B}. \quad (1)$$

$$nG = \frac{G}{R+G+B} \quad (2)$$

$$nB = \frac{B}{R+G+B}. \quad (3)$$

Consistent with the present embodiments, a function is generated to determine the amount of grayness of a pixel element based upon the nR, nG, nB for that pixel element. In particular, this grayness indicator function (IFUNC) is used to specify the degree or amount of grayness as a function of the exact combination of nR, nG, nB of the pixel element being analyzed. This grayness indicator function (IFUNC) is proportional to a probability distribution, which may be expressed as Pr(Gray|(R,G,B)). In the discussion to follow, the latter function may be used interchangeably with the term IFUNC, to represent the grayness indicator function.

As evident from the equations (1) to (3) above, it is to be noted that for any given pixel element only two of three equations are independent. In other words, by definition, the sum of nR+nG+nB is equal a fixed value of 1. Thus, if any two of the three normalized values nR, nG, nB are specified, the third normalized value is also determined, that is, the third normalized value is specified inherently as being the difference between the value 1 and the sum of the other two normalized values. Accordingly, the grayness indicator function IFUNC may be conveniently plotted as a function of two independent normalized values.

Consistent with various embodiments a grayness indicator function is generated in which the grayness indicator function reaches a maximum when all nR, nG, nB are all equal and reaches a minimum when one of the normalized gray level intensities equals one. Thus, a maximum in the grayness indicator function indicates a perfect grayness for a given pixel, while a minimum in the grayness indicator function indicates a pure single color in that pixel. FIG. 4 depicts one exemplary grayness indicator function 306, which is plotted as a function of nR and nG. In particular, FIG. 4 represents a three dimensional graph having a set of mutually orthogonal axes in which axis 402 corresponds to the value of nR, axis 404 corresponds to the value of nG and axis 406 corresponds to the value of IFUNC. As evident, in this embodiment IFUNC may vary between 0 and 1. In order to incorporate the amount of grayness for a given pixel element in a continuous and stable manner, the grayness indicator function IFUNC may be constructed in the following manner. At a point in the nR-nG plane 408 corresponding to where the coordinates of nR, nG equal (⅓, ⅓), the value of the grayness indicator function IFUNC is set to equal 1. Notably, at this point in parameter space, the value of nB is also ⅓ in accordance with the boundary conditions established by the equations (1) to (3) above. Accordingly, the point (⅓, ⅓) in the nR-nG plane 408 specifies a condition in which all the normalized grayness levels nR, nG, nB of a given pixel element (see, e.g., pixel element 206 of FIG. 3) are equal. Under this condition the portion of an image recorded by the pixel element may be deemed to be ideally gray, which corresponds to a value of 1, representing the highest value of the grayness indicator function IFUNC.

It is to be noted that the point (⅓, ⅓) in the nR-nG plane may be generated from different pixel elements in a sensor where the different pixel elements exhibit different gray level intensities for a recorded image. For example, using an 8-bit gray level scheme, the gray level intensity values for R, G, and B in a first pixel element 206 may be "124," "124," and "124," respectively. It can be easily seen from equations (1)-(3) and from FIG. 4 that these gray level intensity values yield a value of 1 for the of the grayness indicator function IFUNC 306. In a second pixel element 206, the gray level intensity values for R, G, and B may be "193," "193," and "193," respectively. Similarly, these gray level intensity values yield a value of 1 for the of the grayness indicator function IFUNC 306. Thus, the overall detected luminance may vary among different pixel elements that are determined to be ideally gray according to the grayness indicator function IFUNC 306.

As further shown in FIG. 4, the value of the grayness indicator function IFUNC 306 decreases from 1 at nR, nG= (⅓, ⅓) for any other point of the nR-nG plane. At nR, nG=(0, 0), nR, nG=(1, 0), and nR, nG=(0, 1), the value of the grayness indicator function IFUNC 306 is zero. These points correspond respectively to a pixel element in which the gray level intensity R and gray level intensity G are zero, the gray level intensity R is zero and gray level intensity B is zero, and the gray level intensity R is zero and B is zero. Each of these latter three points thus represents the case where only a single color cell of a pixel element detects a recordable signal. Accordingly, the grayness indicator function IFUNC 306 yields a value of 0 indicating that such a pixel element is the opposite of gray, since only a single color is detected.

In the example of FIG. 4 the grayness indicator function IFUNC 306 decreases from a value of 1 in a symmetrical manner about the point nR, nG=(⅓, ⅓) shown as peak 410 in FIG. 4. However, in other embodiments, the grayness indicator function IFUNC 306 need not decrease in a symmetrical fashion so long as the grayness indicator function IFUNC 306 is strictly decreasing about nR, nG=(⅓, ⅓) and vanishes at nR, nG=(0, 0); nR, nG=(1, 0), and nR, nG=(0, 1).

In various embodiments, a grayness indicator function, such as the grayness indicator function IFUNC 306, may be prestored in a memory for use by a white balance module during image processing of a mosaicked image. For example, the grayness indicator function IFUNC 306 may be stored in a table or other data structure at discrete values of nR, nG. In some cases, the values for grayness indicator function IFUNC 306 may be discretized using a chosen bit resolution of the unit value.

Figure 5:
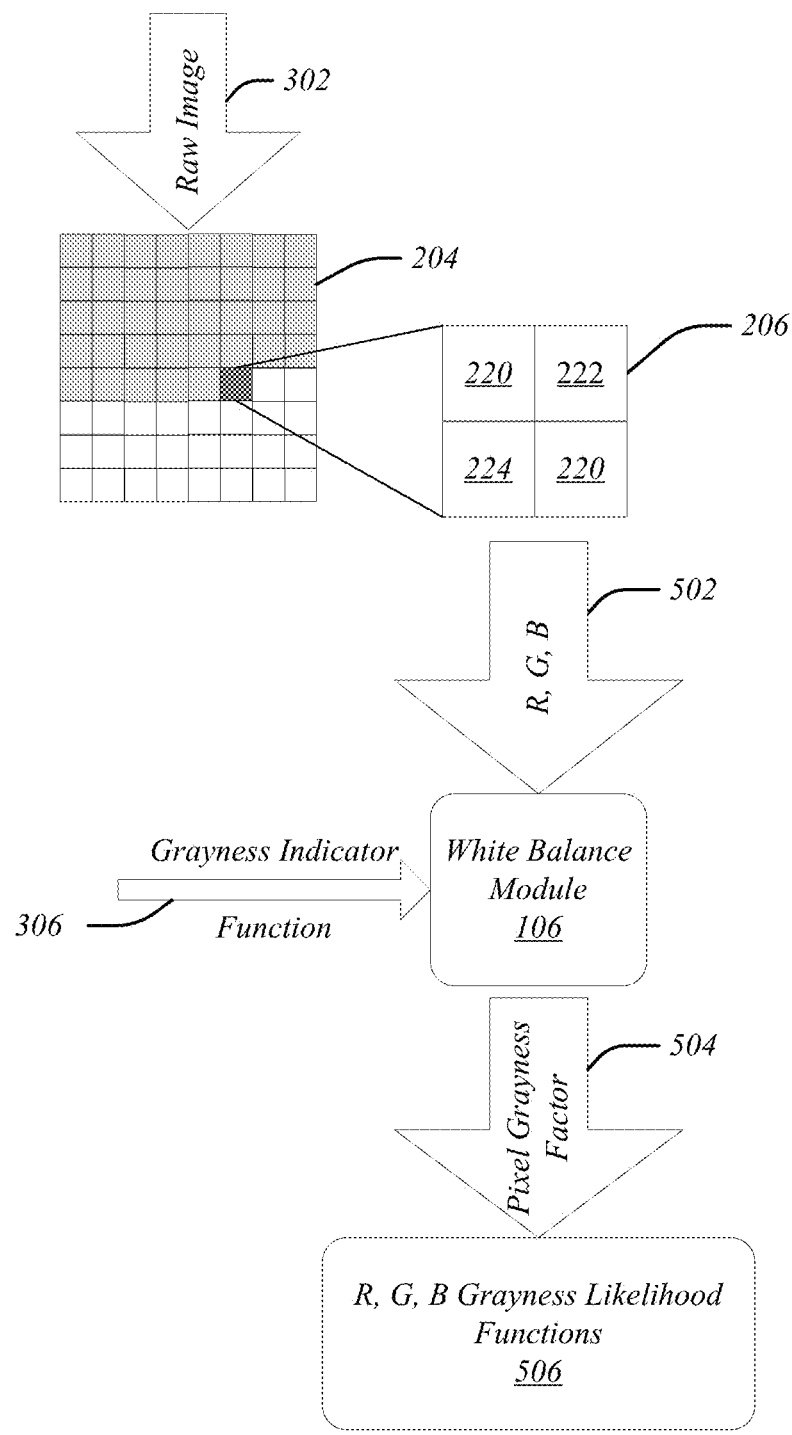
FIG. 5 depicts more details of operation of an exemplary white balance module.

In accordance with various embodiments, as detailed with respect to FIGS. 6A to 6C below, the white balance module 106 may employ the grayness indicator function IFUNC 306 to build so called grayness likelihood functions for the different colors of a mosaicked image, which are in turn used to determine appropriate white balance gains to be applied to the mosaicked image. In particular, FIG. 5 depicts the general flow for building a series of R, G, B grayness likelihood functions 506. The R, G, B grayness likelihood functions 506 project the grayness indicator function IFUNC 306 into each individual color component red, green, blue recorded by pixel elements of a sensor. In various embodiments as generally shown in FIG. 5, the R, G, B grayness likelihood functions 506 are incrementally built by the white balance module 106 as each pixel element is evaluated.

In various embodiments, the R, G, B grayness likelihood functions 506 may be represented by Pr (Gray|R), Pr (Gray|G), and Pr (Gray|B), respectively. These functions may constitute discrete functions that each have a predefined domain, such as [0, 255] for an eight-bit scheme. The range of the R, G, B grayness likelihood functions 506 may be a subset of the set of non-negative real numbers.

Figure 6:
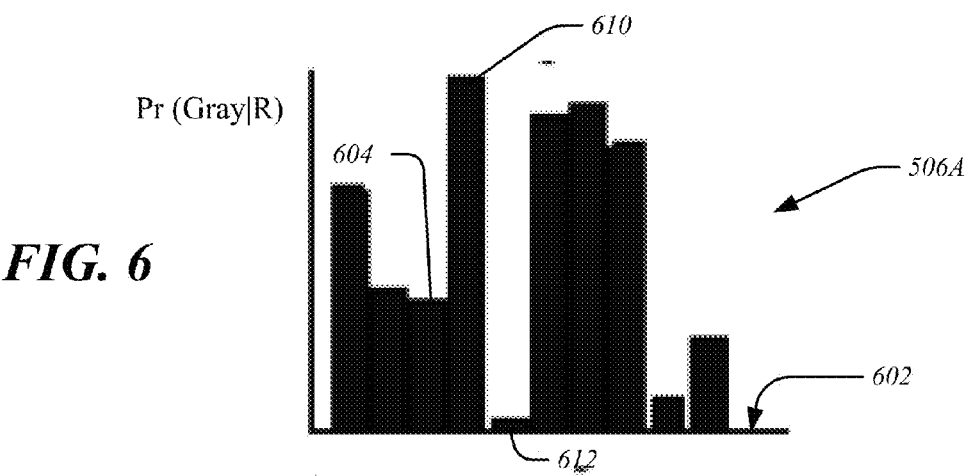
FIG. 6 depicts another exemplary function.
Figure 7:
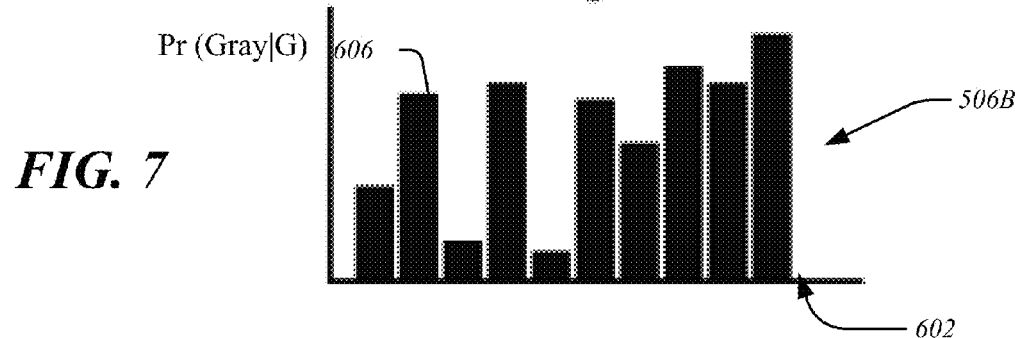
FIG. 7 depicts a further exemplary function.
Figure 8:
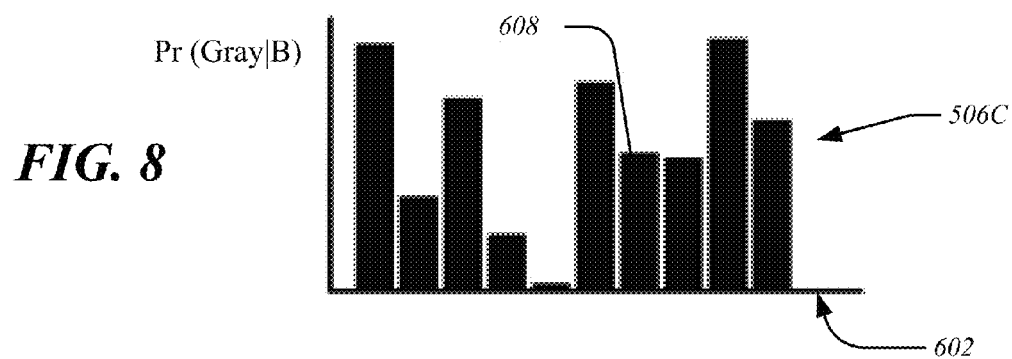
FIG. 8 depicts yet another exemplary function.

FIGS. 6, 7, and 8 depict exemplary red grayness likelihood function 506A, green grayness likelihood function 506B, and blue grayness likelihood function 506C, respectively. The grayness likelihood functions 506A, 506B, 506C, which are shown in histogram form, may represent the situation after a number of pixel elements 206 have been processed, as suggested by FIG. 5. The grayness likelihood functions 506A, 506B, 506C may be thought of as marginal conditional probability densities that express, for each color channel, the grayness "contribution" to gray-like pixels of an image as a function of gray level.

Turning in particular to FIG. 6, the red grayness likelihood function 506A may define a series of gray level values represented by different points along the axis 602. As noted, in some embodiments a total of 256 different levels or values may be spanned by the red grayness likelihood function 506A. Accordingly, the histograms of FIGS. 6-8 are shown for the purposes of general illustration and are not meant to denote any specific number of gray levels that participate in a given grayness likelihood function. In general, each of these gray levels of the grayness likelihood function 506A may correspond to a different red (pixel) gray level value R, which in some embodiments may correspond to an 8-bit grayscale. The green grayness likelihood function 506B, and blue grayness likelihood function 506C may be arranged to span the same range of grayscale values.

In detail, each of the grayness likelihood functions 506A, 506B, 506C may be built as follows. When processing an image, for each pixel element 206, the white balance module 106 may receive a triplet of red, green, and blue gray level values R, G, B, which are detected by a respective sub-pixel of the given pixel element 206. Subsequently, the white balance module 106 may convert the R, G, B triplet of the given pixel into a triplet of normalized RGB values nR, nG, and nB for the pixel element, as described above. The white balance module 106 may then evaluate a grayness indicator function such as IFUNC 306 for the determined normalized R, G, B triplet.

Following the example of FIG. 4, the grayness indicator function IFUNC, or Pr (Gray|(R, G, B)), may be may be evaluated as a function of nR, nG determined for each pixel element 206 of a sensor. The white balance module 106 then generates a pixel grayness factor 504 for a current pixel element, which represents the value of Pr (Gray|(R, G, B)) given the calculated values of nR, nG (nB is determined according to Eqs (1)-(3) once the other pair is determined) of the current pixel element. In FIG. 4, there is shown an example of determination of a grayness factor that is indicated by the point 414. This point represents the surface of the grayness indicator function IFUNC 306 for (nR, nG)=(0.3, 0.25). In this case, the value of the pixel grayness factor is represented by the projection 414 of point 412 onto the axis 406. For the particular example shown, the pixel grayness factor equals 0.6.

Once the pixel grayness factor is calculated for a pixel element, the value of the pixel grayness factor is added to the R, G, B grayness likelihood functions, Pr (Gray|R), Pr (Gray|G), and Pr (Gray|B). As illustrated in the example of FIG. 5, the pixel grayness factor 504 is output to update the R, G, B grayness likelihood functions 506. For any given pixel element, the calculated pixel grayness factor 504 is added to a specific R, G, B grayness likelihood function at the respective detected R, G, B values of the pixel element. Following the example of FIG. 4, for (nR, nG)=(0.3, 0.25), (and nB=0.45), the pixel grayness factor of 0.6 may be added to bins or columns in a histogram that correspond to the detected gray level intensity for the color pixel from which nR, nG are determined. In the example of FIG. 6 these gray levels correspond to the features (levels) 604, 606, 608 in respective R, G, B grayness likelihood functions, 506A, 506B, and 506C, to which the value of pixel grayness factor of 0.6 is added.

As further depicted by the respective R, G, B grayness likelihood functions 506A, 506B, and 506C, the final values once an entire image is processed indicate the proportional contribution to grey-like pixels of the image from a respective R, G, B color channel. In other words, the R, G, B grayness likelihood functions 506A, 506B, and 506C indicate how much each gray level for red, green and blue sub-pixels participated in the gray-like pixels in the image. Thus, for example, in the grayness likelihood function 506A for red sub-pixels, the histogram height varies strongly as a function of gray level values along the axis 602. In particular, the feature 610 indicates a relatively greater participation for that gray level as compared to most other gray levels, while the feature 612 indicates a relatively lesser participation for that gray level as compared to most other gray levels.

Once determined for the full image, the grayness likelihood functions may be used to calculate white balance gains to be applied to the mosaicked image as follows. The gray level values R, G, B may be elements of V, where V=[0, 1, 2, . . . , 255] for the case of an 8-bit grayscale image. The parameters GVAL, RVAL, BVAL may be determined as follows:

$$GVAL = \Sigma_i V_i Pr(Gray | G_i = V_i) \quad (4)$$

$$RVAL = \Sigma_i V_i Pr(Gray | R_i = V_i) \quad (5)$$

$$BVAL = \Sigma_i V_i Pr(Gray | B_i = V_i) \quad (6)$$

In one implementation, the gain for green sub-pixels Green$_{Gain}$ may be set to equal a value of 1. In this manner the gains for red sub-pixels Red$_{Gain}$ and for blue sub-pixels Blue$_{Gain}$ may be determined as follows:

$$Red_{Gain} = GVAL/RVAL \quad (7)$$

$$Blue_{Gain} = GVAL/BVAL \quad (8).$$

After determination of the respective white balance gains, these gains may be applied to adjust sub-pixel grayscale values. Notably, these white balance gains represent a more accurate set of gains than the gains determined by Gray World or Gray Edge methods, because the white balance gains of the present embodiments constitute a weighted sum of the likelihood of the combinations of red, green and blue to "be" gray within the given image.

It is to be further noted that in various embodiments, the white balance gains may or may not be exactly associated with known white balance gains for the given sensor at a known color temperature. In one example, the given sensor for all potential source temperatures might be calibrated followed by stabilizing the gains by choosing the closest set of gains along the color temperature profile to the calculated gains. Additionally, white balancing might smoothly proceed from one set of gains to another, remaining along the color temperature profile, utilizing a smoothing algorithm between consecutive images.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
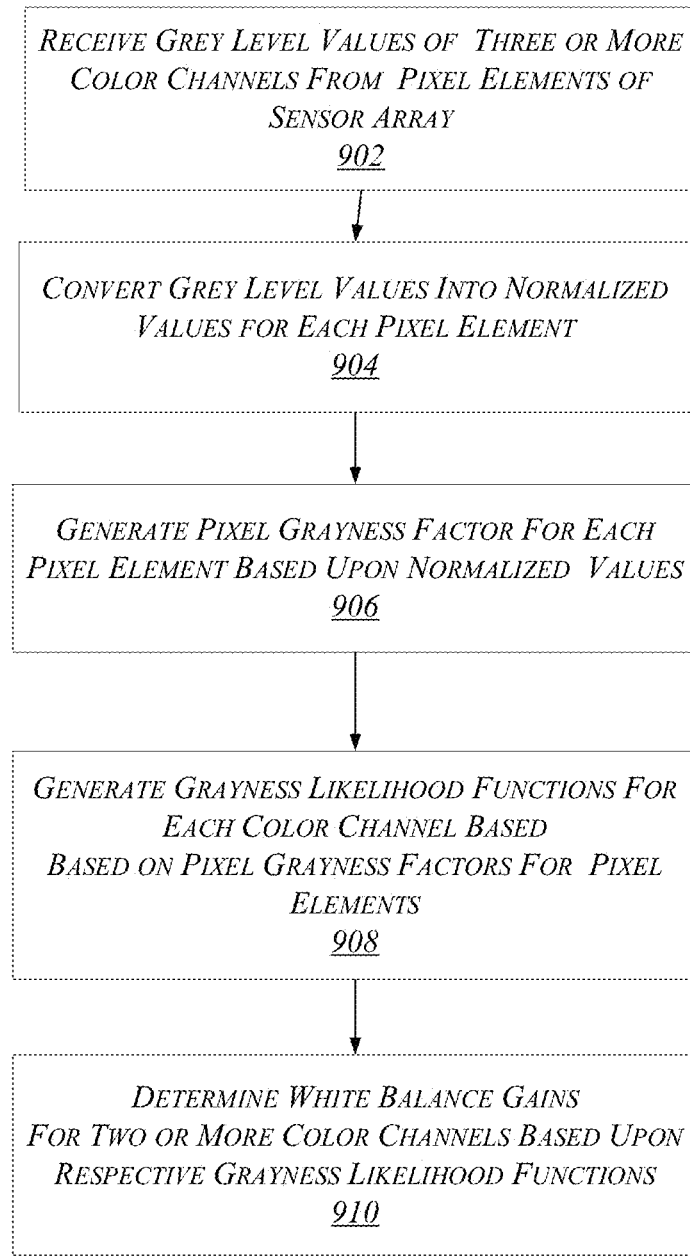
FIG. 9 depicts an exemplary first logic flow.

FIG. 9 depicts an exemplary first logic flow 900. The logic flow 900 may be implemented, for example, by a white balance component or module for processing an image. At block 902, gray level values are received for three or more color channels from pixel elements of a sensor array. In some implementations, a pixel element may include a 2×2 "super-pixel" comprising a red sub-pixel, blue sub-pixel and two green sub-pixels. At block 904, grey level values for the three or more color channels are converted to normalized values for each pixel element. At block 906, a pixel grayness factor is generated for each pixel element based upon the normalized values of that pixel element.

At block 908 grayness likelihood functions are generated for each color channel based upon the pixel grayness factors determined for each pixel. At block 910, white balance gains are determined for two or more color channels based upon respective grayness likelihood functions.

Figure 10:
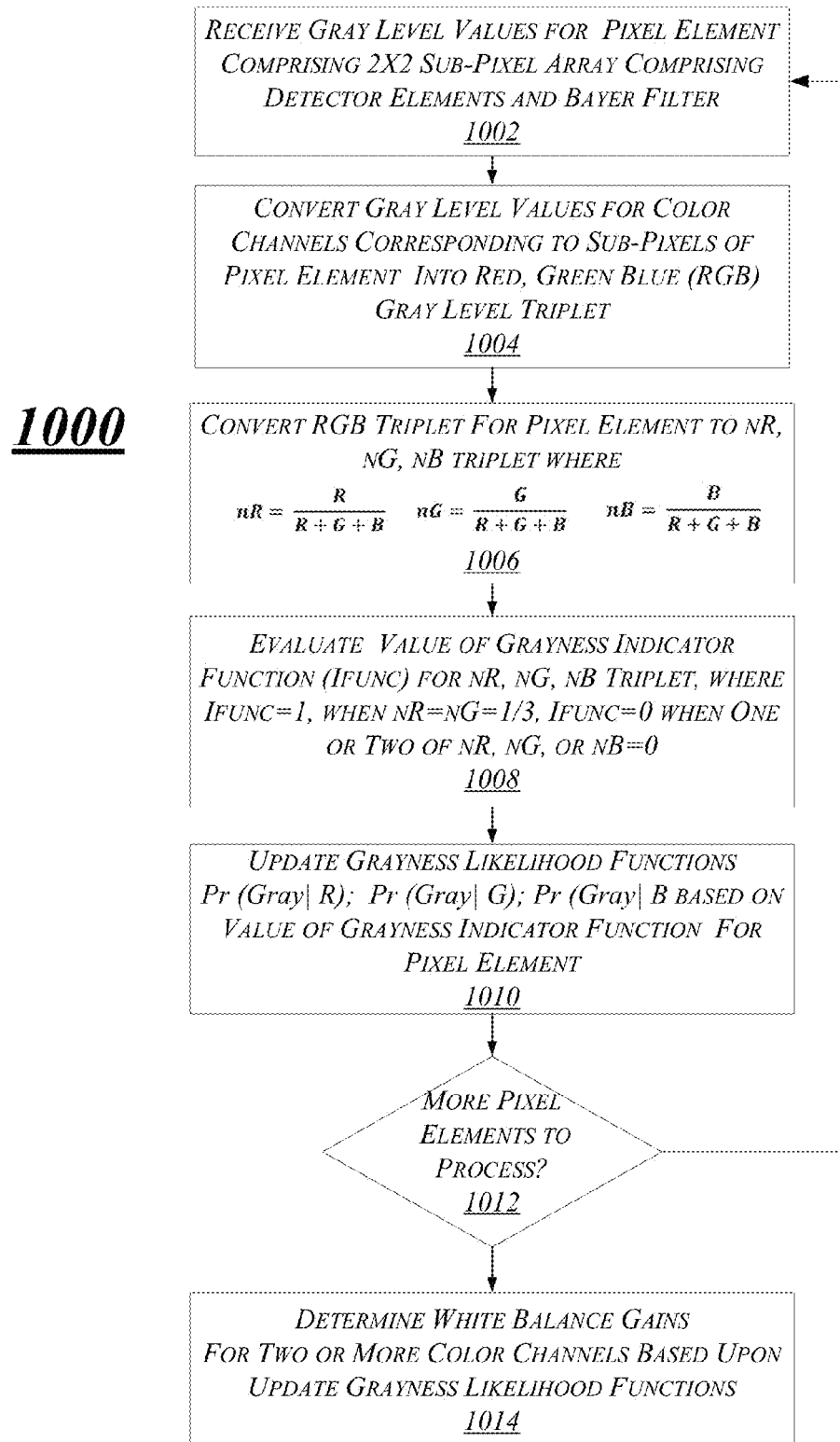
FIG. 10 shows an exemplary second logic flow.

FIG. 10 depicts an exemplary second logic flow 1000. At block 1002, gray level values are received for a pixel element comprising a 2×2 array of sub-pixels, where each sub-pixel includes a detector element covered by a Bayer filter element. At block 1004, the gray level values of color channels corresponding to the sub-pixels of each pixel element are converted into a Red, Green Blue (RGB) gray level triplet At block 1006, the RGB triplet for a pixel element is converted into a normalized triplet nR, nG, nB triplet where $$nR = \frac{R}{R+G+B}$$

$$nG = \frac{G}{R+G+B}$$

$$nB = \frac{B}{R+G+B}.$$

At block 1008, a grayness indicator function (IFUNC) is evaluated for the nR, nG, nB triplet, where IFUNC=1, when nR=nG=⅓, and where IFUNC=0, when one or two of nR, nG, or nB=0. At block 1010 a set of grayness likelihood functions, Pr (Gray|R); Pr (Gray|G); Pr (Gray|B) is updated based upon the value of the grayness indicator function for the pixel element.

The flow then proceeds to decision block 1012 where a determination is made as to whether there are more pixel elements to process. If so, the flow returns to block 1002. If not, the flow proceeds to block 1014. At block 1014, white balance gains are determined for two or more color channels based upon the updated grayness likelihood functions.

Figure 11:
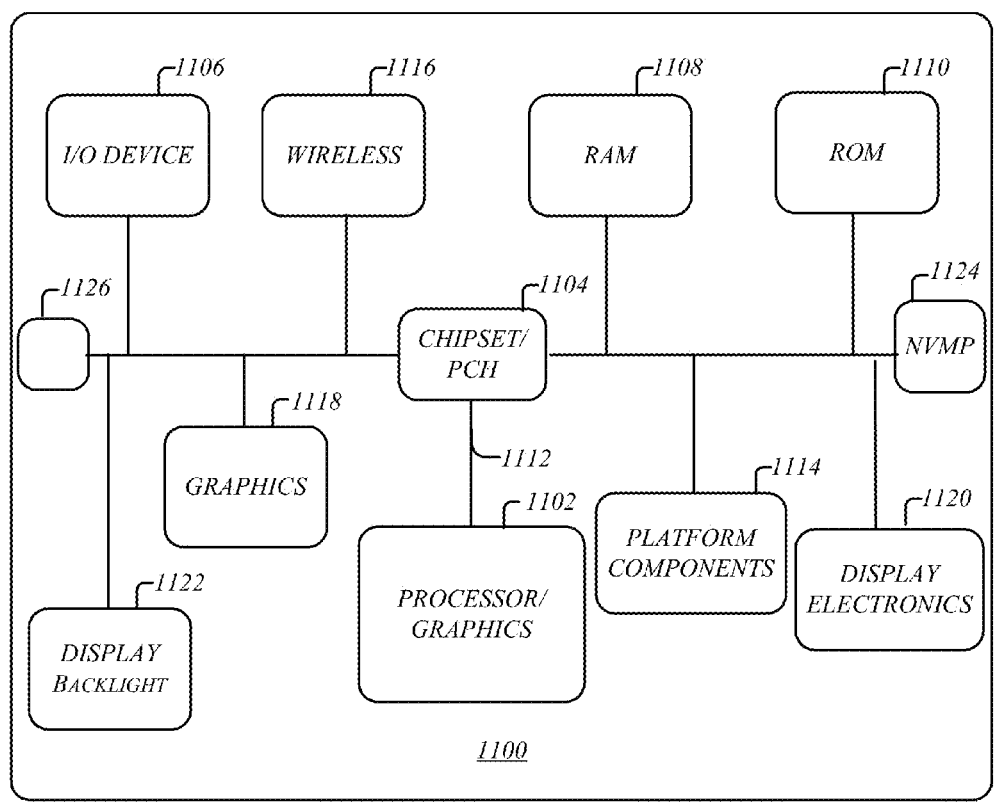
FIG. 11 illustrates an exemplary system architecture.

FIG. 11 is a diagram of an exemplary system embodiment and in particular, FIG. 11 is a diagram showing a platform 1100, which may include various elements. For instance, FIG. 11 shows that platform (system) 1100 may include a processor/graphics core 1102, a chipset/platform control hub (PCH) 1104, an input/output (I/O) device 1106, a random access memory (RAM) (such as dynamic RAM (DRAM)) 1108, and a read only memory (ROM) 1110, display electronics 1120, display backlight 1122, and various other platform components 1114 (e.g., a fan, a crossflow blower, a heat sink, DTM system, cooling system, housing, vents, and so forth). System 1100 may also include wireless communications chip 1116 and graphics device 1118. The embodiments, however, are not limited to these elements.

As shown in FIG. 11, I/O device 1106, RAM 1108, and ROM 1110 are coupled to processor 1102 by way of chipset 1104. Chipset 1104 may be coupled to processor 1102 by a bus 1112. Accordingly, bus 1112 may include multiple lines.

Processor 1102 may be a central processing unit comprising one or more processor cores and may include any number of processors having any number of processor cores. The processor 1102 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1102 may be multiple separate processors located on separate integrated circuit chips. In some embodiments processor 1102 may be a processor having integrated graphics, while in other embodiments processor 1102 may be a graphics core or cores.

The following examples pertain to further embodiments.

Example 1 is an apparatus for processing an image, comprising an image sensor containing a multiplicity of pixel elements to detect one or more images, a processor circuit coupled to the image sensor, and a white balance module for execution on the processor circuit to receive, based upon a detected image of the one or more images, three or more gray level values for a respective three or more color channels for a plurality of pixel elements of the multiplicity of pixel elements; to determine three or more grayness likelihood functions for the respective three or more color channels, the three or more grayness likelihood functions comprising a proportional contribution to grey pixels of the detected image from one or more gray levels for each respective color channel; and to determine a white balance gain for two or more color channels of the three or more color channels based upon the determined three or more grayness likelihood functions.

In Example 2, the sensor of Example 1 can optionally include a red channel, green channel, and blue channel, and the white balance module may be for execution on the processor circuit to apply a grayness indicator function IFUNC to each pixel element of the multiplicity of pixel elements to determine each of the grayness likelihood functions, IFUNC having a value equal to 1 when a normalized red color channel intensity nR and a normalized green color channel intensity nG are equal to ⅓, and IFUNC having a value of 0 when one or two of nR, nG, or nB are equal to 0, where $$nR = \frac{R}{R+G+B}$$
$$nG = \frac{G}{R+G+B}$$
$$nB = \frac{B}{R+G+B}.$$

In Example 3, the subject matter of any one of Examples 1-2 can optionally include a memory to store the grayness indicator function as a set of discrete values of normalized values, nR, nG, nB.

In Example 4, the pixel element of any one of Examples 1-3 can optionally include a red sub-pixel, blue sub-pixel, and two green sub-pixels, a green color channel comprising an average intensity value of the two green sub-pixels.

In Example 5, the white balance module of any one of Examples 1-4 can optionally be for execution on the processor circuit to determine the set of grayness likelihood functions by determining a respective gray level value R, G, and B, for respective red, green, and blue sub-pixels of each pixel element, by determining a normalized intensity level nR, nG, and nB for each of R, G, and B, where $$nR = \frac{R}{R+G+B}$$
$$nG = \frac{G}{R+G+B}$$
$$nB = \frac{B}{R+G+B},$$

by determining a grayness factor for the each pixel comprising a value of IFUNC at the determined normalized intensity levels nR, nG, and by adding the grayness factor to a gray level of each of the respective R, G, B grayness likelihood functions corresponding, the gray level corresponding to the detected gray level value R, G, and B.

In Example 6, the three or more color channels of any one of Examples 1-5 may optionally include red, green, and blue channels that comprise intensity of respective red, green and, blue components of a pixel element of the image, wherein each pixel element is composed of a red sub-pixel, blue sub-pixel, and two green sub-pixels.

In Example 7, the three or more grayness likelihood functions of any one of Examples 1-6 may optionally include a respective red, green and blue grayness likelihood function, Pr (Gray|R), Pr (Gray|G), and Pr (Gray|B) that each spans a range of gray values $V_i$ the white balance module for execution on the processor circuit to determine the white balance gain by setting gain for green pixel components Green$_{Gain}$, to equal 1, by determining gain for red pixel components Red$_{Gain}$, to equal GVAL/RVAL, and by determining gain for blue pixel components Blue$_{Gain}$, to equal GVAL/BVAL, where: GVAL=$\Sigma_i V_i$Pr(Gray|G$_i$=V$_i$); RVAL=$\Sigma_i V_i$Pr(Gray|R$_i$=V$_i$): and BVAL=$\Sigma_i V_i$Pr(Gray|B$_i$=V$_i$).

In Example 8, the white balance module of any one of Examples 1-7 may optionally be for execution on the processor circuit to identify one or more white regions within the image, and send instructions to adjust intensity for pixel components corresponding to two or more color channels in each or the one or more white regions according to a respective two or more determined white balance gains.

In Example 9, the white balance module of any one of Examples 1-8 may optionally be for execution on the processor circuit to generate white balance gains for a successive images of the one or more images by applying a smoothing algorithm between a first set of gains calculated for a first image and a second set of gains calculated for a second image subsequent to the first image.

In Example 10, the white balance module of any one of Examples 1-9 may optionally be for execution to post process the image.

In Example 11, the apparatus of any one of Examples 1-10 may optionally comprise a network interface to transmit the post-processed image.

In Example 12, at least one computer-readable storage medium optionally includes a plurality of instructions that, when executed, cause a system to receive, based upon a detected image of the one or more images, for a plurality of pixel elements of the multiplicity of pixel elements, three of more gray level values for a respective three or more color channels, to determine three or more grayness likelihood functions for the respective three or more color channels, the three or more grayness likelihood functions comprising a proportional contribution to grey pixels of the detected image from one or more gray levels for each respective color channel, and to determine a white balance gain for two or more color channels of the three or more color channels based upon the determined three or more grayness likelihood functions.

In Example number 13, the at least one computer-readable storage medium of example 12 optionally includes instructions that, when executed, cause a system to apply a grayness indicator function IFUNC to each pixel element of the multiplicity of pixel elements to determine each of the grayness likelihood functions, IFUNC having a value equal to 1 when a normalized red color channel intensity nR and a normalized green color channel intensity nG are equal to ⅓, and IFUNC having a value of 0 when one or two of nR, nG, or nB are equal to 0, where $$nR = \frac{R}{R+G+B}$$
$$nG = \frac{G}{R+G+B}$$
$$nB = \frac{B}{R+G+B}.$$

In Example number 14, the at least one computer-readable storage medium of any one of Examples 12-13 optionally includes instructions that, when executed, cause a system to determine a green color channel gray level value for a pixel element by averaging values of two green sub-pixels.

In Example number 15, the at least one computer-readable storage medium of any one of Examples 12-14 may optionally include instructions that, when executed, cause a system to determine the set of grayness likelihood functions by: determining a respective gray level value R, G, and B, for respective red, green, and blue sub-pixels of each pixel element, by determine a normalized intensity level nR, nG, and nB for each of R, G, and B, where $$nR = \frac{R}{R+G+B}$$
$$nG = \frac{G}{R+G+B}$$
$$nB = \frac{B}{R+G+B},$$

determining a grayness factor for the each pixel comprising a value of IFUNC at the determined normalized intensity levels nR, nG, and adding the grayness factor to a gray level of each of the respective R, G, B grayness likelihood functions corresponding, the gray level corresponding to the detected gray level value R, G, and B.

In Example number 16, the at least one computer-readable storage medium of any one of Examples 12-15 may optionally include instructions that, when executed, cause a system to determine the white balance gain by setting gain for green pixel components $Green_{Gain}$, to equal 1, by determining gain for red pixel components $Red_{Gain}$, to equal GVAL/RVAL, and by determining gain for blue pixel components $Blue_{Gain}$, to equal GVAL/BVAL, where GVAL=$\Sigma_i V_i$Pr (Gray|$G_i$=$V_i$), RVAL=$\Sigma_i V_i$Pr (Gray|$R_i$=$V_i$), and BVAL=$\Sigma_i V_i$Pr (Gray|$B_i$=$V_i$), where $V_i$ is a gray level range.

In Example number 17, the at least one computer-readable storage medium of any one of Examples 12-16 may optionally include instructions that, when executed, cause a system to identify one or more white regions within the image, and send instructions to adjust intensity for pixel components corresponding to two or more color channels in each or the one or more white regions according to a respective two or more determined white balance gains.

In Example number 18, the at least one computer-readable storage medium of any one of Examples 12-17 may optionally include instructions that, when executed, cause a system to generate white balance gains for a successive images of the one or more images by applying a smoothing algorithm between a first set of gains calculated for a first image and a second set of gains calculated for a second image subsequent to the first image.

In Example number 19, the at least one computer-readable storage medium of any one of Examples 12-18 may optionally include instructions that, when executed, cause a system to post process the image.

In Example number 20 a computer-implemented method includes receiving, based upon a detected image, for a plurality of pixel elements of a multiplicity of pixel elements, three of more gray level values for a respective three or more color channels, determining a set of three or more grayness likelihood functions for a respective three or more color channels of the image, the three or more grayness likelihood functions comprising a proportional contribution to grey pixels of the image from a respective color channel, and determining a white balance gain for two or more color channels of the three or more color channels based upon the determined set of three or more grayness likelihood functions.

In Example number 21 the three or more color channels of Example 20 may optionally include a red channel, green channel, and blue channel, and the method includes applying a grayness indicator function IFUNC to each pixel element of the multiplicity of pixel elements to determine each of the grayness likelihood functions, IFUNC having a value equal to 1 when a normalized red color channel intensity nR and a normalized green color channel intensity nG are equal to ⅓, and IFUNC having a value of 0 when one or two of nR, nG, or nB are equal to 0, where $$nR = \frac{R}{R+G+B}$$
$$nG = \frac{G}{R+G+B}$$
$$nB = \frac{B}{R+G+B}.$$

In Example number 22 the computer-implemented method of any one of Examples 20-21 may optionally include storing the grayness indicator function as a set of discrete values of normalized values, nR, nG, nB.

In Example number 23 the computer-implemented method of any one of Examples 20-22 may optionally include determining a respective gray level value R, G, and B, for respective red, green, and blue sub-pixels of each pixel element, determining a normalized intensity level nR, nG, and nB for each of R, G, and B, where $$nR = \frac{R}{R+G+B}$$
$$nG = \frac{G}{R+G+B}$$
$$nB = \frac{B}{R+G+B},$$

determining a grayness factor for the each pixel comprising a value of IFUNC at the determined normalized intensity levels nR, nG, and adding the grayness factor to a gray level of each of the respective R, G, B grayness likelihood functions corresponding, the gray level corresponding to the detected gray level value R, G, and B.

In Example number 24 the computer-implemented method of any one of Examples 20-23 may optionally include determining the white balance gain by setting gain for green pixel components $Green_{Gain}$, to equal 1, by determining gain for red pixel components $Red_{Gain}$, to equal GVAL/RVAL, and by determining gain for blue pixel components $Blue_{Gain}$, to equal GVAL/BVAL, where GVAL=$\Sigma_i V_i \Pr(\text{Gray}|G_i=V_i)$, RVAL=$\Sigma_i V_i \Pr(\text{Gray}|R_i=V_i)$, and BVAL=$\Sigma_i V_i \Pr(\text{Gray}|B_i=V_i)$, where $V_i$ is a gray level range.

In Example number 25 the computer-implemented method of any one of Examples 20-24 may optionally include identifying one or more white regions within the image, and sending instructions to adjust intensity for pixel components corresponding to two or more color channels in each or the one or more white regions according to a respective two or more determined white balance gains.

In Example number 26 the computer-implemented method of any one of Examples 20-25 may optionally include generating white balance gains for successive images by applying a smoothing algorithm between a first set of gains calculated for a first image and a second set of gains calculated for a second image subsequent to the first image.

In Example number 27 the computer-implemented method of any one of Examples 20-26 may optionally include post processing the image.

In Example number 28, an apparatus may optionally include means to perform the method of any one of Examples 20-27.

In Example number 29 at least one machine readable medium may optionally comprise a plurality of instructions that in response to being executed on a computing device, cause the computing device to carry out a method according to any one of the Examples 20-28.

In Example number 30 a camera may include an image sensor to detect an image, a processor circuit coupled to the image sensor to generate a mosaicked image based upon the detected image, the mosaicked image comprising a set of detected gray levels for three or more color channels for a plurality of pixel elements of the image sensor, and a white balance module for execution on the processor circuit to: generate normalized intensity values for the three or more color channels for a plurality of pixel element portions of the mosaicked image, to determine a value of a grayness indicator function based upon the normalized intensity values for the plurality of pixel element portions, the grayness indicator function equaling a maximum when all normalized intensity values for a pixel element are equal, and to determine a white balance gain for two or more color channels of the three or more color channels based upon the determined indicator function value for the plurality of pixel element portions.

In Example number 31, the white balance module of Example 30 may optionally be for execution on the processor circuit to: generate respective grayness likelihood functions for the respective three or more color channels, each grayness likelihood function being determined by adding for the plurality of pixel element portions a value of the determined grayness indicator function to a respective gray level bin corresponding to a detected gray level for a given color channel, and to determine a white balance gain for two or more color channels of the three or more color channels based upon the generated respective grayness likelihood functions.

In Example number 32, the three or more grayness likelihood functions of any one of Examples 30-31 may optionally include a respective red, green and blue grayness likelihood function, $\Pr(\text{Gray}|R)$, $\Pr(\text{Gray}|G)$, and $\Pr(\text{Gray}|B)$ that each spans a range of gray values $V_i$, the white balance module for execution on the processor circuit to determine the white balance gain by: setting gain for green pixel components Green$_{Gain}$, to equal 1, determining gain for red pixel components Red$_{Gain}$, to equal GVAL/RVAL, and determining gain for blue pixel components Blue$_{Gain}$, to equal GVAL/BVAL, where GVAL=$\Sigma_i V_i \Pr(\text{Gray}|G_i=V_i)$, RVAL=$\Sigma_i V_i \Pr(\text{Gray}|R_i=V_i)$, and BVAL=$\Sigma_i V_i \Pr(\text{Gray}|B_i=V_i)$.

In Example number 33, the sensor of any one of Examples 30-32 may optionally include a red channel, green channel, and blue channel, the grayness indicator function having a value equal to 1 when a normalized red color channel intensity nR and a normalized green color channel intensity nG are equal to ⅓, and the grayness indicator function having a value of 0 when one or two of nR, nG, or nB are equal to 0, where $$nR = \frac{R}{R+G+B}$$
$$nG = \frac{G}{R+G+B}$$
$$nB = \frac{B}{R+G+B}.$$

In Example number 34, the sensor of any one of Examples 30-33 may optionally include a memory to store the grayness indicator function as a set of discrete values of normalized values, nR, nG, nB.

In Example number 35, the mosaicked image of any one of Examples 30-34 may optionally include a Bayer image including detected gray levels for red, green, and blue color channels generated by a pixel element comprising a red sub-pixel, blue sub-pixel, and two green sub-pixels, a green color channel comprising an average intensity value of the two green sub-pixels.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

What is claimed is:

1. An apparatus, comprising:
an image sensor containing a multiplicity of pixel elements to detect one or more images;
a processor circuit coupled to the image sensor; and
a white balance module for execution on the processor circuit to:
receive, based upon a detected image of the one or more images, three or more gray level values for a respective three or more color channels for a plurality of pixel elements of the multiplicity of pixel elements;
determine three or more grayness likelihood functions for the respective three or more color channels, the three or more grayness likelihood functions comprising a proportional contribution to grey pixels of the detected image from one or more gray levels for each respective color channel; and
determine a white balance gain for two or more color channels of the three or more color channels based upon the determined three or more grayness likelihood functions.

2. The apparatus of claim 1, the sensor comprising a red channel, green channel, and blue channel,
the white balance module for execution on the processor circuit to apply a grayness indicator function IFUNC to each pixel element of the multiplicity of pixel elements to determine each of the grayness likelihood functions,
IFUNC having a value equal to 1 when a normalized red color channel intensity nR and a normalized green color channel intensity nG are equal to ⅓, and
IFUNC having a value of 0 when one or two of nR, nG, or nB are equal to 0, where $$nR = \frac{R}{R+G+B}$$

$$nG = \frac{G}{R+G+B}$$

$$nB = \frac{B}{R+G+B}.$$

3. The apparatus of claim 2, comprising a memory to store the grayness indicator function as a set of discrete values of normalized values, nR, nG, nB.

4. The apparatus of claim 2, the pixel element comprising a red sub-pixel, blue sub-pixel, and two green sub-pixels, a green color channel comprising an average intensity value of the two green sub-pixels.

5. The apparatus of claim 2, the white balance module for execution on the processor circuit to determine the set of grayness likelihood functions by:
    determining a respective gray level value R, G, and B, for respective red, green, and blue sub-pixels of each pixel element;
    determining a normalized intensity level nR, nG, and nB for each of R, G, and B, where $$nR = \frac{R}{R+G+B}$$
$$nG = \frac{G}{R+G+B}$$
$$nB = \frac{B}{R+G+B};$$

determining a grayness factor for the each pixel comprising a value of IFUNC at the determined normalized intensity levels nR, nG; and
    adding the grayness factor to a gray level of each of the respective R, G, B grayness likelihood functions corresponding, the gray level corresponding to the detected gray level value R, G, and B.

6. The apparatus of claim 1, the three or more color channels comprising red, green, and blue channels that comprise intensity of respective red, green and, blue components of a pixel element of the image, wherein each pixel element is composed of a red sub-pixel, blue sub-pixel, and two green sub-pixels.

7. The apparatus of claim 1, the three or more grayness likelihood functions comprising a respective red, green and blue grayness likelihood function, Pr (Gray|R), Pr (Gray|G), and Pr (Gray|B) that each spans a range of gray values $V_i$, the white balance module for execution on the processor circuit to determine the white balance gain by:
    setting gain for green pixel components $Green_{Gain}$, to equal 1;
    determining gain for red pixel components $Red_{Gain}$, to equal GVAL/RVAL; and
    determining gain for blue pixel components $Blue_{Gain}$, to equal GVAL/BVAL;
    where:

$GVAL=\Sigma_i V_i Pr(Gray|G_i=V_i);$ $RVAL=\Sigma_i V_i Pr(Gray|R_i=V_i);$ and $BVAL=\Sigma_i V_i Pr(Gray|B_i=V_i).$ 8. The apparatus of claim 1, the white balance module for execution on the processor circuit to:
    identify one or more white regions within the image; and
    send instructions to adjust intensity for pixel components corresponding to two or more color channels in each or the one or more white regions according to a respective two or more determined white balance gains.

9. The apparatus of claim 1, the white balance module for execution on the processor circuit to generate white balance gains for successive images of the one or more images by applying a smoothing algorithm between a first set of gains calculated for a first image and a second set of gains calculated for a second image subsequent to the first image.

10. The apparatus of claim 1, the white balance module for execution to post process the image.

11. The apparatus of claim 10, further comprising a network interface to transmit the post-processed image.

12. At least one non-transitory computer-readable storage medium comprising a plurality of instructions that, when executed, cause a system to:
    receive, based upon a detected image of one or more images, for a plurality of pixel elements of a multiplicity of pixel elements, three of more gray level values for a respective three or more color channels;
    determine three or more grayness likelihood functions for the respective three or more color channels, the three or more grayness likelihood functions comprising a proportional contribution to grey pixels of the detected image from one or more gray levels for each respective color channel; and
    determine a white balance gain for two or more color channels of the three or more color channels based upon the determined three or more grayness likelihood functions.

13. The at least one non-transitory computer-readable storage medium of claim 12 comprising instructions that, when executed, cause a system to:
    apply a grayness indicator function IFUNC to each pixel element of the multiplicity of pixel elements to determine each of the grayness likelihood functions,
    IFUNC having a value equal to 1 when a normalized red color channel intensity nR and a normalized green color channel intensity nG are equal to ⅓, and
    IFUNC having a value of 0 when one or two of nR, nG, or nB are equal to 0, where $$nR = \frac{R}{R+G+B}$$
$$nG = \frac{G}{R+G+B}$$
$$nB = \frac{B}{R+G+B}.$$

14. The at least one non-transitory computer-readable storage medium of claim 13 comprising instructions that, when executed, cause a system to determine a green color channel gray level value for a pixel element by averaging values of two green sub-pixels.

15. The at least one non-transitory computer-readable storage medium of claim 13 comprising instructions that, when executed, cause a system to determine the set of grayness likelihood functions by:
    determining a respective gray level value R, G, and B, for respective red, green, and blue sub-pixels of each pixel element; determine a normalized intensity level nR, nG, and nB for each of R, G, and B, where $$nR = \frac{R}{R+G+B}$$
$$nG = \frac{G}{R+G+B}$$
$$nB = \frac{B}{R+G+B}; \text{ and}$$

determining a grayness factor for the each pixel comprising a value of IFUNC at the determined normalized intensity levels nR, nG; and adding the grayness factor to a gray level of each of the respective R, G, B grayness likelihood functions corresponding, the gray level corresponding to the detected gray level value R, G, and B.

16. The at least one non-transitory computer-readable storage medium of claim 13 comprising instructions that, when executed, cause a system to post process the image.

17. The at least one non-transitory computer-readable storage medium of claim 12 comprising instructions that, when executed, cause a system to determine the white balance gain by:
  setting gain for green pixel components Green$_{Gain}$, to equal 1;
  determining gain for red pixel components Red$_{Gain}$, to equal GVAL/RVAL; and
  determining gain for blue pixel components Blue$_{Gain}$, to equal GVAL/BVAL;
  where:

$GVAL=\Sigma_i V_i Pr(Gray|G_i=V_i)$;

$RVAL=\Sigma_i V_i Pr(Gray|R_i=V_i)$;

$BVAL=\Sigma_i V_i Pr(Gray|B_i=V_i)$;

where $V_i$ is a gray level range.

18. The at least one non-transitory computer-readable storage medium of claim 12 comprising instructions that, when executed, cause a system to:
  identify one or more white regions within the image; and
  send instructions to adjust intensity for pixel components corresponding to two or more color channels in each or the one or more white regions according to a respective two or more determined white balance gains.

19. The at least one non-transitory computer-readable storage medium of claim 12 comprising instructions that, when executed, cause a system to generate white balance gains for successive images of the one or more images by applying a smoothing algorithm between a first set of gains calculated for a first image and a second set of gains calculated for a second image subsequent to the first image.

20. A computer-implemented method, comprising:
  receiving, based upon a detected image, for a plurality of pixel elements of a multiplicity of pixel elements, three of more gray level values for a respective three or more color channels;
  determining a set of three or more grayness likelihood functions for a respective three or more color channels of the image, the three or more grayness likelihood functions comprising a proportional contribution to grey pixels of the image from a respective color channel; and
  determining a white balance gain for two or more color channels of the three or more color channels based upon the determined set of three or more grayness likelihood functions.

21. The computer-implemented method of claim 20, the three or more color channels comprising a red channel, green channel, and blue channel,
  the method comprising applying a grayness indicator function IFUNC to each pixel element of the multiplicity of pixel elements to determine each of the grayness likelihood functions,
  IFUNC having a value equal to 1 when a normalized red color channel intensity nR and a normalized green color channel intensity nG are equal to ⅓, and
  IFUNC having a value of 0 when one or two of nR, nG, or nB are equal to 0, where $$nR = \frac{R}{R+G+B}$$

$$nG = \frac{G}{R+G+B}$$

$$nB = \frac{B}{R+G+B}.$$

22. The computer-implemented method of claim 21, comprising storing the grayness indicator function as a set of discrete values of normalized values, nR, nG, nB.

23. The computer-implemented method of claim 21, comprising:
  determining a respective gray level value R, G, and B, for respective red, green, and blue sub-pixels of each pixel element;
  determining a normalized intensity level nR, nG, and nB for each of R, G, and B, where $$nR = \frac{R}{R+G+B}$$

$$nG = \frac{G}{R+G+B}$$

$$nB = \frac{B}{R+G+B};$$

determining a grayness factor for the each pixel comprising a value of IFUNC at the determined normalized intensity levels nR, nG; and
  adding the grayness factor to a gray level of each of the respective R, G, B grayness likelihood functions corresponding, the gray level corresponding to the detected gray level value R, G, and B.

24. The computer-implemented method of claim 20, comprising determining the white balance gain by:
  setting gain for green pixel components Green$_{Gain}$, to equal 1;
  determining gain for red pixel components Red$_{Gain}$, to equal GVAL/RVAL; and
  determining gain for blue pixel components Blue$_{Gain}$, to equal GVAL/BVAL;
  where:

$GVAL=\Sigma_i V_i Pr(Gray|G_i=V_i)$;

$RVAL=\Sigma_i V_i Pr(Gray|R_i=V_i)$; and $BVAL=\Sigma_i V_i Pr(Gray|B_i=V_i)$, where $V_i$ is a gray level range.

25. The computer-implemented method of claim 20, comprising:
  identifying one or more white regions within the image; and
  sending instructions to adjust intensity for pixel components corresponding to two or more color channels in each or the one or more white regions according to a respective two or more determined white balance gains.

26. The computer-implemented method of claim 20, comprising generating white balance gains for successive images by applying a smoothing algorithm between a first set of gains calculated for a first image and a second set of gains calculated for a second image subsequent to the first image.

27. The computer-implemented method of claim 20, comprising post processing the image.

* * * * *

UNITED STATES PATENT AND TRADEMARK OFFICE
CERTIFICATE OF CORRECTION

PATENT NO. : 9,036,047 B2  
APPLICATION NO. : 13/797898  
DATED : May 19, 2015  
INVENTOR(S) : Jeffrey Danowitz et al.

Page 1 of 1

It is certified that error appears in the above-identified patent and that said Letters Patent is hereby corrected as shown below:

On the Title page, in item (57), in column 2, in "Abstract", line 7, delete "three of" and insert -- three or --, therefor.

In The Drawings

On sheet 7 of 9, in Figure 9, reference numeral 908, line 3, before "ON" delete "BASED".

In The Claims

In column 20, line 10, in claim 12, delete "three of" and insert -- three or --, therefor.

In column 21, lines 43-44, in claim 20, delete "three of" and insert -- three or --, therefor.

Signed and Sealed this  
Seventeenth Day of May, 2016

Michelle K. Lee  
*Director of the United States Patent and Trademark Office*